United States Patent

Kaufmann et al.

[11] Patent Number: 5,669,628
[45] Date of Patent: Sep. 23, 1997

[54] AIR BAG CUSHION PROTECTION DURING BOTH NORMAL AND OUT OF POSITION DEPLOYMENTS

[75] Inventors: James R. Kaufmann, Salt Lake City; Kirk H. Rasmussen, West Point, both of Utah

[73] Assignee: Morton International, Inc., Chicago, Ill.

[21] Appl. No.: 629,128

[22] Filed: Apr. 8, 1996

[51] Int. Cl.⁶ .................................................. B60R 21/30
[52] U.S. Cl. ............................................ 280/739; 280/743.1
[58] Field of Search .................................. 280/739, 740, 280/742, 743.1, 743.2

[56] References Cited

U.S. PATENT DOCUMENTS

| | | | |
|---|---|---|---|
| 3,879,057 | 4/1975 | Kawashima et al. | 280/743.2 |
| 4,097,065 | 6/1978 | Okada et al. | 280/739 |
| 4,181,325 | 1/1980 | Barnett | 280/739 |
| 5,078,423 | 1/1992 | Fujita | 280/743.2 |
| 5,165,716 | 11/1992 | Imai et al. | 280/730.1 |
| 5,211,422 | 5/1993 | Frantz et al. | 280/740 |
| 5,226,671 | 7/1993 | Hill | 280/743.1 |
| 5,246,250 | 9/1993 | Wolanin et al. | 280/739 |
| 5,249,825 | 10/1993 | Gordon et al. | 280/728.1 |
| 5,280,953 | 1/1994 | Wolanin et al. | 280/739 |
| 5,447,330 | 9/1995 | Tagawa et al. | 280/739 |
| 5,492,363 | 2/1996 | Hartmeyer et al. | 280/739 |
| 5,538,279 | 7/1996 | Link et al. | 280/739 |

*Primary Examiner*—Kenneth R. Rice
*Attorney, Agent, or Firm*—A. Donald Messenheimer; Gerald K. White

[57] ABSTRACT

An air bag cushion with a controlling doubler to provide occupant protection during both normal and out of position deployment has an enlarged gas permeable area for venting inflation gases. An obstruction to full deployment, such as a person against the steering wheel, causes venting through the enlarged area to be maintained thereby to prevent a full pressure build up which may cause injury to such person as he is pushed out of the way as the cushion deploys. Displacement of the face panel beyond a predetermined position releases a hinge mounted flap of gas impermeable material which seals off that portion of the gas permeable area that is in excess of the venting needed for a normal deployment. The flap is propelled to a closing position by the inflation gas during deployment.

14 Claims, 3 Drawing Sheets

AIR BAG CUSHION PROTECTION DURING BOTH NORMAL AND OUT OF POSITION DEPLOYMENTS

This invention relates to vehicle air bag cushions, and more particularly to occupant protection during both normal and out of position occupant deployments.

BACKGROUND OF THE INVENTION

It is known from U.S. Pat. No. 5,280,953 to Wolanin et al. to change the effective venting area of a base panel, which receives the inflation gas, by use of one or more sliding valve flaps to control the flow of inflation gas through respective vent openings in response to the extent of displacement of the face panel as it moves toward an occupant seating position. While the amount of venting is adjustable, it is difficult to control how much sliding movement will be provided where an obstruction such as an out of position occupant is encountered. The slide must initially be open with the small vent holes 38 aligned and care must be taken to avoid stitching through the slide during assembly or an unwanted breaking of the tether in which case normal full deployment may not occur. The construction disclosed provides a potential for error.

SUMMARY OF THE INVENTION

The present invention offers a novel method and simplified construction to protect against undesired full pressure deployment in the event an obstruction such as an out of position occupant is encountered by the face panel of an air bag cushion during deployment. An excess venting capability is allowed to remain in operative condition in the event such an obstruction exists; however, if an obstruction is not detected, the amount of venting which is deemed excessive is blocked off by hinged flaps which are urged into a closing position under the influence of the deployment gas flow.

By the present invention, the amount of venting to accomplish both the normal FMVSS 208 deployment and a protective deployment can be achieved by controlling the size of both the large venting area for protective deployment and the smaller venting area for normal deployment with precision and reduced manufacturing costs. Reliability of performance is enhanced from use of hinge mounted flaps which swing from an open position to a closed position by becoming unattached from a connection to the face panel as it deploys past a predetermined position along its path toward an occupant in a normal occupant seating position.

A preferred apparatus employs two or four flaps, although a single flap could be used. Each flap is secured to the base panel by stitches disposed peripherally around the opening for receiving the inflation gas. A free end of each flap is mounted for swinging movement about the stitches which serve as a hinge line and is attached to move with the face panel as by means of a tether. Where a tether is used, the tether is secured at one end to the face panel and at its other end to the base panel; the free end of a respective flap is releasably attached at a point intermediate the ends of the tether with the distance between the attachment point and the base panel securement stitch as measured along the tether being greater than the same distance as measured along the flap. As the face panel moves beyond a predetermined position toward the normal occupant seating position indicating no obstruction, the attachment separates and the flap free end is propelled by the inflation gases to a position closing part of the venting area so that a normal deployment can occur.

These and other objects and advantages of the invention will become more fully apparent from the claims and from the description as it proceeds in conjunction with the drawings.

DETAILED DESCRIPTION

Figure 1:
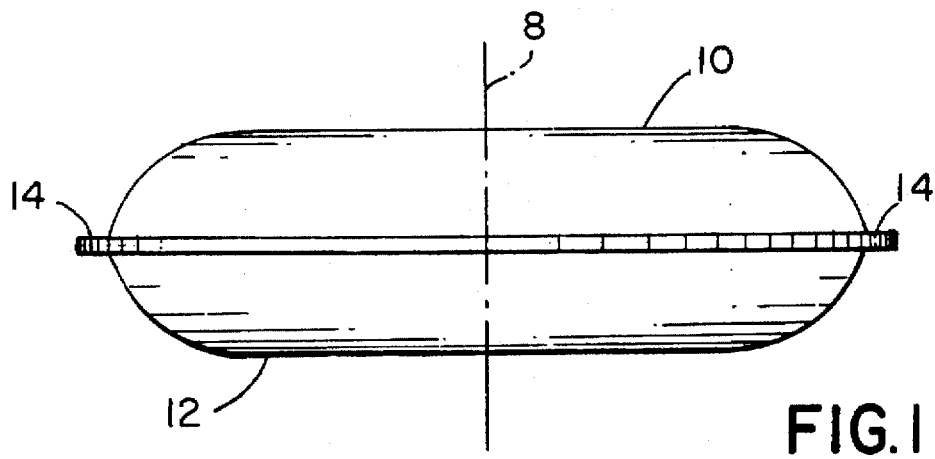
FIG. 1 is a side elevation of an inflated air bag cushion into which the present invention is incorporated.
Figure 2:
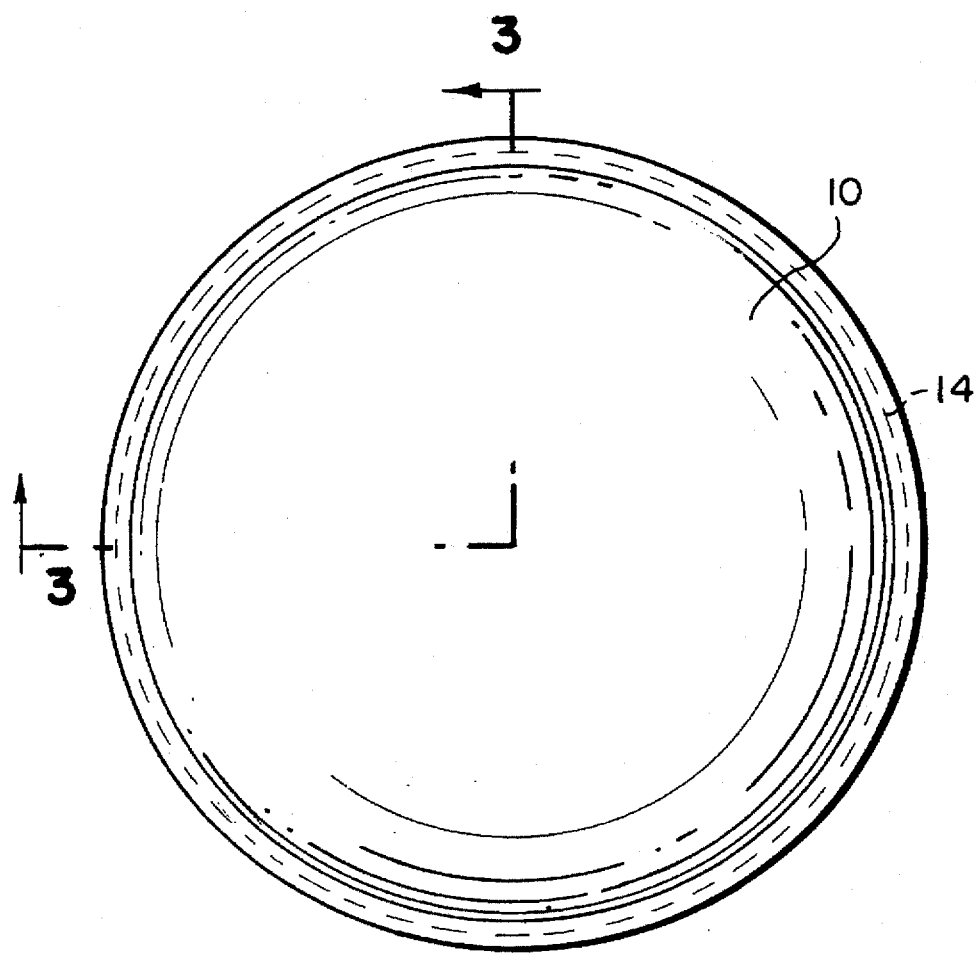
FIG. 2 is a plan view of the cushion of FIG. 1.

Referring to FIG. 1, the air bag cushion has a face panel 10 that is adapted to contact a vehicle passenger seated in an occupant seating area and a base panel 12 which is secured to the vehicle at a position from where inflation gas is supplied when deployment of the air bag cushion is desired. Panels 10 and 12 have low gas permeability, which can be accomplished by use of low permeability fabrics or through coating. The outer peripheral edges of face panel 10 and base panel 12 may be joined together in a conventional manner as by stitches 14, see FIG. 1–3 to define the perimeter of the cushion. In FIG. 2, only half of the cushion is shown. The cushion is symmetrical about the centerline 8.

Figure 4:
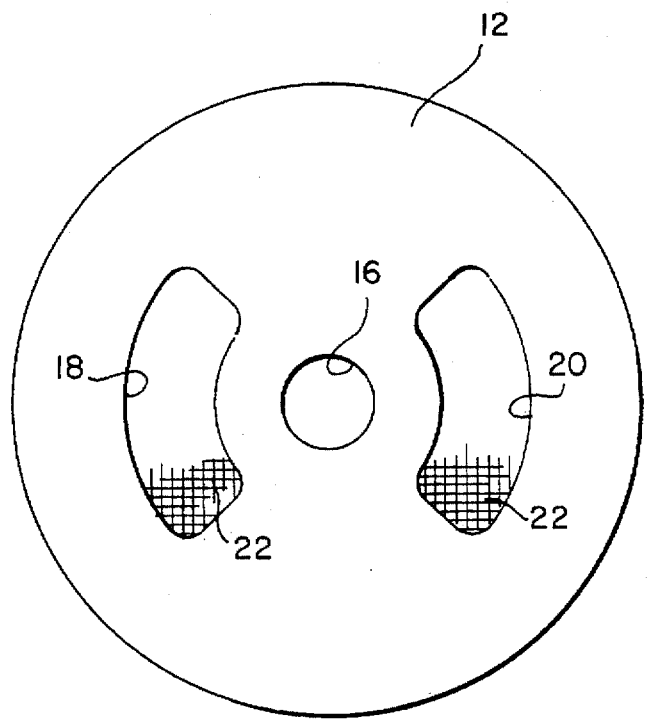
FIG. 4 is a plan view to a smaller scale of the base panel exterior.

Before stitching, the face panel 10 and the base panel 12 may be cut to have two openings 18 and 20 approximately the same size and shape. The base panel 12 is shown in FIG. 4 to have a conventional inflation gas receiving opening defined by wall 16 and two high permeability areas 18 and 20 where the low permeability material has been removed. Areas 18 and 20 preferably are symmetrically disposed with respect to inflation gas opening 16. High permeability areas 18 and 20 are preferably covered by a suitable open woven fabric such as high permeability screens 22 mounted on an inside surface of base panel 12. The amount of high permeability area may vary as one or more continuous areas may be used for venting or a number of conventional unscreened cuts which serve as vents may be provided.

Figure 3:
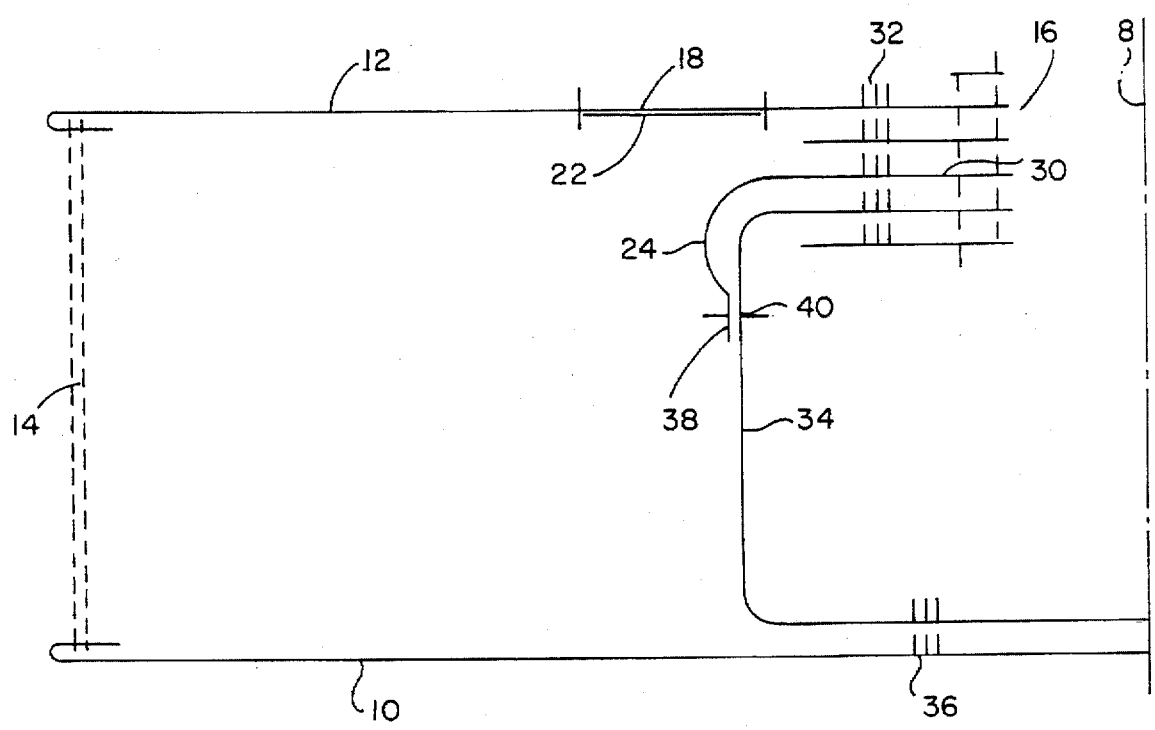
FIG. 3 is a schematic view to an enlarged scale of the panels taken long line 3—3 of FIG. 2 showing diagrammatically a flap, its tether and stitching that illustrates the construction on one side of the centerline, the entire cushion being symmetrical about the centerline.
Figure 5:
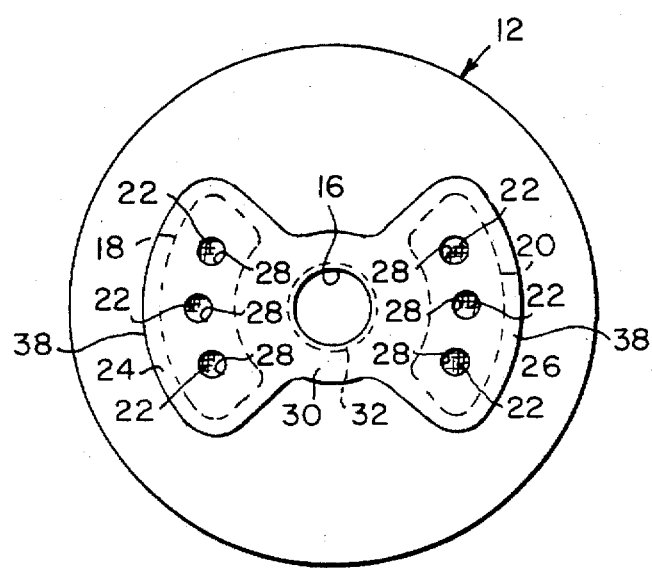
FIG. 5 is a plan view of the base panel interior showing the flaps in place on the base panel for a normal deployment.

The cushion is normally built with several doublers (see FIG. 3). One of these doublers which is formed of a low permeability material, includes a hinged flap 24 associated with area 18 and hinged flap 26 is associated with area 20 as indicated in FIG. 5. In this embodiment, flaps 24 and 26 have a shape and size to fully cover their respective low permeability areas 18, 20 shown in FIG. 4 and are preferably provided with vent holes 28 shown in FIG. 5. The areas of vent holes 28 may be controlled with precision which simplifies achieving the exacting conditions for a normal deployment. Alternatively, the total area of the high permeability regions 18 and 20 may be precisely controlled, or even made into a single area. The flaps 24 and 26 can be smaller than regions 18 and 20 and subtract a precisely controlled area by being made of a high permeability material without vent holes 28.

Flaps 24 and 26 are conveniently formed from a single piece of low permeability material, cut as indicated in FIG. 5 and located on the same side of the base panel 12 as the screens 22. The central portion 30 may be an integral part of the flaps 24 and 26 and be secured by stitches 32 around the periphery of the wall 16 which defines the central opening 16 through which inflation gas is received.

Two tethers 34 (only one is illustrated in FIG. 3), located on the same side of the base panel 12 as the screens 22, are attached by stitches 30 at one end to the base panel 12 and by stitches 36 at the other end to the face panel 10 as illustrated. Four tethers could be used.

The flaps 24, 26 of FIGS. 3 and 5 have one end secured by the stitches 32 that surround central opening 16 and may be sandwiched between the base panel 12, the central portion 30 of the tethers 34 other layers which provide reinforcement around central opening 16. The free ends 38 of the flaps 24, 26 are attached at intermediate position 40 along the lengths of their respective tethers 34. As shown in FIG. 3, the attach point at the intermediate position 40 is designed to come apart as tether 34 is placed under tension by reason of the face panel 10 passing a predetermined position without being obstructed. At this point in time, the flap free end 38 of the doubler moves away from the tether 30 and is propelled toward the high permeability area 18 or screen 22 by the inflation gas flow toward the exterior of the air bag cushion.

The distance between the attach point 40 and the stitches 32 as measured along the flap 24 is less than the same distance as measured along the tether 34. Thus, as the face panel 10 is displaced in a direction away from the base wall 12, tension in tether 34 between stitches 36 and attach point 40 increases without placing a tension load on that portion of the tether 34 between attach point 40 and the stitches. Instead, the tension force on the flap 24 increases. Since the stitch strength at attach point 40 is very low, as indicated by the single line 40, when compared with the strength of the stitches at seams 32, 36 and indicated by three lines, the attach point 40 separates and comes apart as the face panel 10 passes a predetermined position. The predetermined position may be chosen by the selection of the location of the attach point 40 on tether 34. If the flap free end 38 is sufficiently long, the free end 38 may be directly attached to the face panel 10 by a weak seam that is bonded or stitched, thereby avoiding the for an attachment to a tether.

The flap 24 is illustrated to have vent holes 28 similar to those in production cushions. The vent holes 28 are sized such that when the flap 24 totally covers the high permeability area screen 22, the exact amount of venting occurs to provide occupant protection during a normal deployment. There should be enough overlap of the flaps 24, 26 to assure sealing of the permeable areas of the back panel 12 and allow venting only through the vents 28 cut into the flaps 24, 26. This simplifies the execution of a design that will reliably meet the requisite performance requirements.

During an obstructed deployment, the cushion will begin to open as normal. The face panel 10 will not travel to the end of the tethers 34, but will tend to stop when it hits an obstruction. During this type of deployment, the doublers or flaps 24, 26 will remain attached to the face panel 10 via the tethers 34 and allow the gases to vent through the very large areas of high permeability, and into the atmosphere. This allows the cushion to vent the gases to the atmosphere instead of filling the cushion and causing possible injury.

The advantages of the present invention can be achieved by other constructions which are easy to manufacture by avoiding variables and allow precision in the determination of the venting ability of the gas permeable areas. Breaking a seam is controllable. A hinged flap is easier to control than a sliding flap. For example, the base panel 10 could be essentially completely porous through much or all of its area, the flaps have a low permeability without vents and the size of the flap chosen with precision. The mechanics of deployment would be identical to the one described above, i.e. in the event the face panel does not encounter an obstruction, the flaps would release and be forced into position by the gas flow during deployment. This would restrict the amount of venting and cause the cushion to fill for a normal deployment.

Another alternative construction is to provide a cushion with vents required for normal deployment that are placed in an area not covered by the flaps at any time during deployment. Additional vents are provided in the base panel which the flaps having a low permeability will cover during normal deployment. With the flaps held out of the way during an out-of-position deployment, the gases which would produce an undesired force on the obstruction, which in a passenger side installation may be an infant seat, will be vented from the cushion. During normal deployment, the flaps will be detached from the tethers and forced by the influence of the gas flow to cover the additional vents. In this case, the gases will pass only through the vents normally present and provide the normal occupant protection.

The claims are not to be limited to the details disclosed as all variations and modifications which incorporate the spirit of the invention and fall within the scope of the claims are intended to be covered thereby.

What is claimed is:

1. In a method of protecting a vehicle passenger who is out of a normal occupant seating position by reducing the force applied to a face panel of an air bag cushion relative to the force applied during a normal air bag cushion deployment:

providing an air bag cushion having a face panel of a fabric that is generally gas impermeable and a base panel having a wall defining an opening through which inflation gas is received during deployment and at least one area that is gas permeable which allows venting of a portion of the inflation gas when deployment of the cushion starts by moving the face panel toward the occupant seating position, said base panel gas permeable area having a venting capability which exceeds that required for venting from the cushion to produce a normal deployment;

reducing the base panel gas permeable area size during an unobstructed deployment of the face panel toward the occupant seating position by providing a flap having first and second ends and made of a material that is gas impermeable, said first end being fixed relative to the base panel along a hinge line and secured to the inside of base panel along side of said at least one gas permeable area, said second end being mounted for swingable movement during deployment between a first position which allows inflation gas flow through said at least one gas permeable area to the outside of the cushion and a second position which blocks a part of said gas flow to an amount that reduces venting from the cushion to that which provides a normal deployment; and releasing said flap to move from said first position to said second position under the influence of the inflation gas received through said base panel opening in response to advancement of the face panel during deployment past a predetermined position in its normal deploying path toward the occupant seating position, and propelling said flap from said first position to said second position under the influence of the inflation gas received for deploying said air bag cushion.

2. The method of claim 1 wherein the flap hinge line is positioned between a wall of said inflation gas opening and said at least one gas permeable area and the method further comprises maintaining the second flap end in its first position by a structure including an attachment at a point which becomes unattached in response to displacement of the face panel past said predetermined position.

3. The method of claim 2 wherein said structure further includes a tether having first and second ends, the first end being secured to the base panel and the second end being secured to the face panel; and securing the first end of the flap to the first end of tether and attaching the second end of the flap to the tether at an intermediate position along the tether length, the distance between said intermediate position and the first end of the flap being less than the distance along the length of the tether between said intermediate position and the first end of the tether whereby said attachment releases in response to a tension force on the tether resulting from a displacement of the face panel beyond said predetermined position.

4. The method of claim 1 wherein the flap, when in its second position, fully covers the gas permeable area in the base panel and contains at least one permeable area sized to allow continued gas escape at a level that provides normal deployment.

5. The method of claim 1 wherein the base panel has multiple gas permeable areas, the flap is completely gas impermeable and sized to allow continued gas escape, when in its second position, at a level that provides normal deployment.

6. An occupant air bag cushion inflatable to restrain an occupant in an occupant seating position in a vehicle, comprising:

said cushion having a face panel and a base panel providing a multiple venting areas through which inflation gas is vented from the air bag cushion during deployment including a first, relatively large venting area to provide an occupant out of position deployment and a second, relatively small venting area that is effective to provide an occupant normal position deployment;

said base panel having a wall defining an opening through which inflation gas is received and having at least one gas permeable vent opening as part of said first venting area that is not part of the second venting area;

a flap for closing said part of said venting area that is not part of the second venting area during deployment in response to face panel advancement beyond a predetermined location toward said occupant seating position;

a tether having opposite ends, one end being secured to the base panel and the other end being secured to the face panel;

a first end of the flap being secured to the base panel and the tether one end at the location where the tether one end is secured to the base panel; and a second end of the flap being releasably attached to an intermediate position on said tether with the distance from the back panel to the intermediate position as measured along the length of the tether being greater than the same distance as measured along the length of the flap.

7. The air bag cushion of claim 6 wherein said venting areas are covered by screen material that is fastened to an inside surface of the base panel, the flap and the tether are both on the inside of said bag and the second end of said flap, when detached, swings to a position which covers at least part of said screen material under the influence of the inflation gas.

8. The air bag cushion of claim 6 wherein the releasable attachment of the flap second end to the tether is by a seam whose strength is sufficiently weak to release in response to the advancement of the face panel beyond said predetermined position, said flap second end being propelled solely by the force of the inflation gas to cover said part of said first vent area that is not part of said second vent area.

9. The air bag cushion of claim 6 wherein the base panel has a wall forming a centrally located inflation gas receiving opening, the securement of the first flap end and the tether end to the base panel is by stitches of thread positioned peripherally around the side wall of said inflation gas receiving opening so that when the second flap end is released from the tether, the flap is forced over to at least partially close said first large venting area solely due to the force caused by the flow of the inflation gas.

10. The air bag cushion of claim 9 wherein the base panel has at least two gas permeable vent openings, the cushion contains one separate flap for each of said two venting openings with a separate tether for each flap, and the first ends of the flaps are secured to and sandwiched between the base panel and their respective tethers by stitches positioned on diametrically opposite sides of the inflation gas receiving opening.

11. An occupant air bag cushion inflatable to restrain an occupant in an occupant seating position comprising:

an air bag cushion having a base panel with a first portion adapted to receive inflation gas and a second portion having a gas permeable area for venting a portion of the inflation gas outside of the air bag cushion, said bag having a face panel of gas impermeable material for deployment toward said occupant seating position upon inflation of the cushion;

a hinged flap secured along a hinge line on the base panel to be inside the air bag cushion at a position where inflation gas is introduced into the air bag and having a free end opposite said hinge line, said flap having a shape and size adapted to fit with said gas permeable area, said free end being disposed so as to be urged toward a position covering said gas permeable area solely due to the flow of the inflation gas; and an attachment between said hinged flap free end and the face panel that restrains the flap from covering said gas permeable area when deployment is initiated, said attachment being effective to move the flap free end with said face panel toward said occupant seating position, said attachment remaining effective to maintain restraint of the flap free end when the displacement of the face panel is obstructed from reaching its normal occupant protection position and to release the flap free end if such obstruction is not encountered thereby causing the flap free end to be propelled by the flow of inflation gas to cover said gas permeable area.

12. The air bag cushion of claim 11 wherein the base panel and the face panel are both made of a fabric having a low gas permeability, the base panel having at least two areas having high gas permeability formed of screen material located on the same side of the base panel as hinged flaps, there being a separate flap for each high permeability area;

said flaps being made of low permeability material and shaped to generally cover said high permeability areas; and vents in said base panel placed in areas not covered by said flaps at any time during deployment effective to provide a normal deployment.

13. The air bag cushion of claim 11 wherein the base panel and the face panel are both made of low permeable fabrics, the base panel having at least two high permeability areas formed of screen material secured to an inside surface of the base panel as said hinged flaps, there being a separate flap for each high permeability area; and said flaps being made of a low permeability material shaped to cover said high permeability areas and containing high permeability regions which perform as vents that serve to provide a normal deployment.

14. The air bag cushion of claim 11 wherein the base panel has a large area of high permeability material, the face panel and flaps are made of low permeability fabrics, and the flaps are shaped to cover all the high permeability material of the base panel excepting for an area effective to provide a normal deployment.

* * * * *